United States Patent
Von Seidel et al.

(10) Patent No.: US 7,007,631 B2
(45) Date of Patent: Mar. 7, 2006

(54) FREEZER FAILURE INDICATOR

(76) Inventors: Michael Von Seidel, 10 Leccino Terrace, Somerset West, Western Cape Province (ZA) 7130; Julian Levin, 6, 5th Avenue, Emmarentia, Johannesburg, Gauteng Province (ZA) 7130

( * ) Notice: Subject to any disclaimer, the term of this patent is extended or adjusted under 35 U.S.C. 154(b) by 77 days.

(21) Appl. No.: 10/500,663

(22) PCT Filed: Jan. 1, 2003

(86) PCT No.: PCT/IB03/00003

§ 371 (c)(1),
(2), (4) Date: Jul. 2, 2004

(87) PCT Pub. No.: WO03/056285

PCT Pub. Date: Jul. 10, 2003

(65) Prior Publication Data

US 2005/0120939 A1    Jun. 9, 2005

(30) Foreign Application Priority Data

Jan. 3, 2002 (ZA) ................... 2002/0047
Apr. 15, 2002 (ZA) ................... 2002/2919

(51) Int. Cl.
*G01K 1/02* (2006.01)
(52) U.S. Cl. .............. 116/216; 116/215; 116/101
(58) Field of Classification Search ............... 116/216, 116/215, 101, 200, DIG. 24
See application file for complete search history.

(56) References Cited

U.S. PATENT DOCUMENTS

| | | | |
|---|---|---|---|
| 3,461,834 A | * | 8/1969 | Linder ............ 116/216 |
| 3,618,558 A | * | 11/1971 | Tepfer ............ 116/216 |
| 3,620,677 A | * | 11/1971 | Morison ............ 116/200 |
| 3,701,282 A | * | 10/1972 | Peterson ............ 116/216 |
| 4,064,828 A | | 12/1977 | Clark |
| 4,114,443 A | | 9/1978 | Clark |
| 4,132,186 A | * | 1/1979 | Manske et al. ............ 116/216 |
| 4,144,532 A | | 3/1979 | Boyd |

(Continued)

FOREIGN PATENT DOCUMENTS

DE     39 40 163 A1     6/1991

(Continued)

*Primary Examiner*—Diego Gutierrez
*Assistant Examiner*—Travis Reis
(74) *Attorney, Agent, or Firm*—Meyertons, Hood, Kivlin, Kowert & Goetzel, P.C.; Eric B. Meyertons

(57) ABSTRACT

A freezer failure indicator assembly is provided comprising an indicator unit in the form of a closed container party filled with an opaque liquid (1) and a support bracket (8) therefor. The container has an opaque zone (2) and a transparent zone (3) arranged to enable the liquid to be pre-frozen within the opaque zone followed by re-orientating the container relative to the bracket to render the transparent zone of the wall visible, devoid of any liquid and lower than the pre-frozen liquid. Thawing of the pre-frozen liquid causes it to move to become visible through the transparent zone. Colour imparting means (13) are carried by the bracket so as to be visible through the said transparent zone in the operative position thereof to thereby impart a first colour to the transparent zone in the absence of any liquid being present in it. The opaque liquid serves to obscure such first colour when the liquid is present in the transparent zone. The liquid has a second colour chosen to provide a colour indication distinctly different from said first colour when the liquid is present in tile transparent zone.

10 Claims, 2 Drawing Sheets

U.S. PATENT DOCUMENTS

| | | | |
|---|---|---|---|
| 4,941,425 A | 7/1990 | Holzer | |
| 4,987,849 A * | 1/1991 | Sherman | 116/200 |
| 5,018,874 A * | 5/1991 | Weynant nee Girones | 116/216 |
| 5,111,768 A * | 5/1992 | Larsson et al. | 116/216 |
| 5,282,684 A * | 2/1994 | Holzer | 116/216 |
| 6,302,054 B1 * | 10/2001 | Mayer, III | 116/216 |
| 6,694,913 B1 * | 2/2004 | Cooperman | 116/216 |
| 2004/0099203 A1 * | 5/2004 | Parker | 116/216 |

FOREIGN PATENT DOCUMENTS

| | | |
|---|---|---|
| DE | 44 18 927 A1 | 12/1995 |
| EP | 0 740 136 A1 | 10/2001 |
| FR | 2 632 405 A | 12/1989 |
| GB | 2 235 969 A | 3/1991 |
| WO | WO 01/73388 A1 | 10/2001 |

* cited by examiner

FREEZER FAILURE INDICATOR

FIELD OF THE INVENTION

This invention relates to a freezer failure indicator by which term is meant an indicator capable of indicating whether or not a freezer, particularly a freezer used for the storage of foodstuffs, but not necessarily so, has failed during a time period under review to the extent that the contents may have thawed, at least to some extent, and then re-frozen after the cause of the failure had become rectified.

BACKGROUND TO THE INVENTION

It is a regular problem for persons who have vacated premises for what may be a relatively long period of time to be certain that a freezer located at such premises has not failed during that time period with the result indicated above.

Freezer failure of the type under consideration can have extremely dire consequences in that frozen food may have become partially or completely thawed for some period of time during which it could develop harmful bacteria or the like followed by re-freezing once the freezer is functional once more. Persons could thus unknowingly consume tainted food and become poisoned by it.

Cold storage and other commercial freezers are usually monitored continuously and a record maintained of the temperature of the freezer so that compliance with cold storage specifications can be checked and authenticated.

However, at a domestic level, and even at the level of small freezers in retail outlets, no such record is maintained and it is not always easy to assess the extent of de-frosting that may have taken place prior to the freezer functioning once more. The condition of frozen foods or other perishables that have the potential to become spoiled is often not known.

Many prior art devices have been proposed to indicate when a freezer has failed to the extent that frozen food stored in the freezer may have thawed to an undesirable extent. Some of these are based on the principle that a solid body rests on or in a body of frozen liquid such that if the liquid thaws the solid body will fall to the bottom of the liquid container and will be easily visible to indicate that thawing has occurred. British Patent No 2,235,969 is an example of a device of this type whilst U.S. Pat. No. 4,144,532 is an example of a more sophisticated version of this type of device in which the weight closes an electric circuit when it falls to the bottom. A reverse principle is employed in U.S. Pat. No. 4,064,828 in which a buoyant indicator is locked within a frozen liquid and if the liquid thaws the buoyant indicator rises.

Other devices simply operate on the locking of a frozen body of liquid in an upper position such that it flows downwards, or in one case laterally, if thawing takes place. The frozen body of liquid is generally created by freezing the liquid in the device with the latter in one orientation and then subsequently inverting the device so that the frozen body of liquid is then uppermost. Some of the devices choose to select liquids with different freezing points, and indeed some use multiple liquid indicators with different freezing points to indicate the degree of the freezer failure. Examples of these devices are German Patents 3,940,163 and 4,418,927 and U.S. Pat. Nos. 4,114,443 and 4,941,425.

Other devices such as that described in European published patent application EP 0 740 136 A1 and applicants' own international patent application published under No WO 01/73388 A1 describe indicators that utilize a non-freezing liquid, in particular an organic liquid such as paraffin, and an immiscible aqueous liquid. With the aqueous liquid frozen, and the indicator inverted, the organic liquid which can typically be coloured green is visible in the lower region of the indicator and in the event of thawing taking place, the aqueous liquid that is typically coloured red replaces it and becomes visible to indicate the failure.

All of these devices are more or less relatively complicated, difficult to manufacture, or do not clearly indicate the failure because they employ a single colour or solid object with only its position changing. In the case of our earlier international patent application the problem of the use of a single colour was overcome by the use of two immiscible liquids. However, this proved to be inconvenient because the most advantageous and non-toxic organic phases were found to exhibit an unsatisfactory partition coefficient, at least after a significant period of time. Also, assembly of the particular embodiment of indicator described in that earlier patent application proved to be difficult in view of the physical and chemical properties of the organic phase.

An additional difficulty with existing proposals, and one that is not dealt with in our earlier application, is the fact that the container of the type of device with which the invention is concerned generally has to be pre-frozen in one orientation and then inverted in order to be rendered functional. It is not always immediately apparent, or, alternatively, not easily perceived, that the indicator has not been inverted from its position in which it becomes pre-frozen to the position in which it becomes functional.

OBJECT OF THE INVENTION

It is an object of the invention to provide a simple freezer failure indicator assembly that can be easily manufactured and that obviates, at least to some extent, one or more of the disadvantages associated with existing indicators.

SUMMARY OF THE INVENTION

In accordance with this invention there is provided a freezer failure indicator assembly comprising an indicator unit and a support bracket therefor wherein the indicator unit is in the form of a closed container defined by walls forming an internal cavity containing a quantity of a liquid having a freezing point selected so that it will be frozen at normal operating temperatures of a freezer with which it is to be used and wherein the walls of the container have an opaque zone and a transparent zone arranged to enable the liquid to be pre-frozen within the opaque zone followed by re-orientating the container relative to the bracket to render the transparent zone of the wall visible, devoid of any liquid in such zone, and lower than the pre-frozen liquid, and wherein thawing of the pre-frozen liquid causes it to move to become visible through the transparent zone, the indicator assembly being characterised in that colour imparting means are carried by the bracket that operatively supports the indicator unit so as to be visible through the said transparent zone in the operative position thereof to thereby impart a first colour to the transparent zone in the absence of any liquid being present in the transparent zone and in that the liquid is rendered opaque so as to obscure such first colour imparting means when the liquid is present in the transparent zone, the liquid having a second colour chosen to provide a colour indication distinctly different from said first colour when the liquid is present in the transparent zone.

Further features of the invention provide for the container to be of upright shape capable of being supported in either of two generally vertical orientations; for the support bracket to be adapted to be attached to the inside wall of a freezer for example; for the indicator unit to have a flange at each end thereof for cooperation with the support bracket or clip to restrict longitudinal movement of the indicator relative to the support bracket or clip; and for the liquid to be water or water, the freezing point of which has been modified by the addition of additives such as an alcohol or a suitable salt.

The opaque portion of the side walls preferably extends from one end of the container for about two-thirds to three quarters of the height of the container whilst the rest of the height defines said transparent zone. The liquid, and thus the second colour, is preferably red. The first colour is preferably a blue or green colour to indicate that there has been no thawing of the freezer contents when the liquid is absent from the transparent zone. Obviously any other indicative colours may be chosen.

The bracket may further have third colour imparting means for imparting a third colour to the transparent zone in its position corresponding to pre-freezing of the indicator unit to thereby indicate that the container needs to be reorientated to render it functional. In the preferred form of this variation of the invention, the bracket has a third colour such as orange or amber at its upper end that is visible through the transparent zone in the pre-freezing orientation and the first colour, typically green or blue, visible through the transparent zone when it is in its lowermost operative position and devoid of liquid.

In order that the invention may be more fully understood different embodiments thereof will now be described with reference to the accompanying drawings.

DETAILED DESCRIPTION WITH REFERENCE TO THE DRAWINGS

Figure 1:
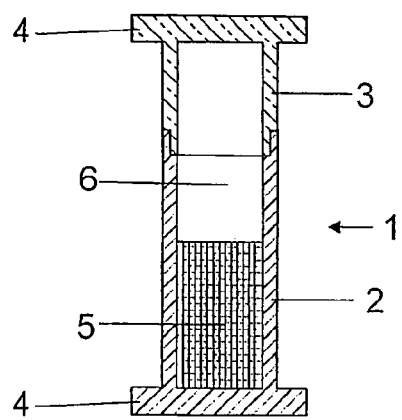
FIG. 1 is a sectional elevation of one embodiment of indicator unit according to the invention.
Figure 2:
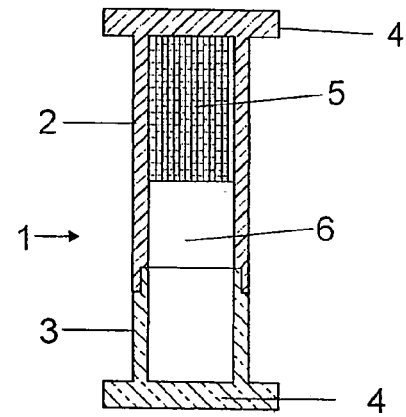
FIG. 2 is a similar sectional elevation illustrating the indicator unit in a pre-frozen and inverted orientation.

In the embodiment of the invention illustrated in FIGS. 1 to 5 the freezer failure indicator assembly includes an indicator unit in the form of a permanently closed container (1) formed of two parts of injection moulded plastics material, the one part (2) being of opaque plastic, conveniently appliance white for example, and the other part (3) being of generally colourless transparent plastics material. Each of the two parts (2) and (3) is of a right circular cylindrical shape having at its free end an integral flange (4) of sufficient dimensions to act as an end stop as will be further described below.

The two parts are configured such that the opaque part extends for at least one half, preferably about two-thirds to three quarters, of the overall height of the assembled container and the two parts overlap somewhat to enable them to be adhesively secured to each other in leak-proof manner. Alternatively, the two parts may be configured to be ultrasonically welded together or permanently secured together in any other way. Effectively, the container is thus opaque for about two-thirds to three quarters of its height.

Prior to the two parts being permanently secured together, there is introduced into the longer of them, a volume of water (5) that is of said second colour, conveniently red. The water optionally has its freezing point modified to depress it if this is required for any particular reason. It is envisaged that for general use on a domestic level or by small retailers, the usual freezing point of water will operate effectively. The water is rendered opaque so that when it occupies the transparent zone it will obscure the first colour of the inside surface of the bracket as will become apparent from the following and itself will be highly visible and blatantly obvious by virtue of the red colour. The volume of water fills about 30% to 40% of the height of the container and is, in any event, sufficient to fill the transparent part (3) when it is lowermost and the water is in a liquid state.

The balance of the volume of the container indicated by numeral (6) remains filled with air which accommodates the expansion and contraction of the volume of water when it freezes or thaws and thereby subjects the indicator unit to a minimum of stress caused by such expansion and contraction.

The indicator unit is to be supported in a freezer by means of a bracket in the form of a clip to be attached to an internal wall of the freezer to form the composite failure indicator assembly. In this manner the indicator does not occupy any significant potential storage space in the freezer and will not be knocked over or be in the way.

Figure 5:
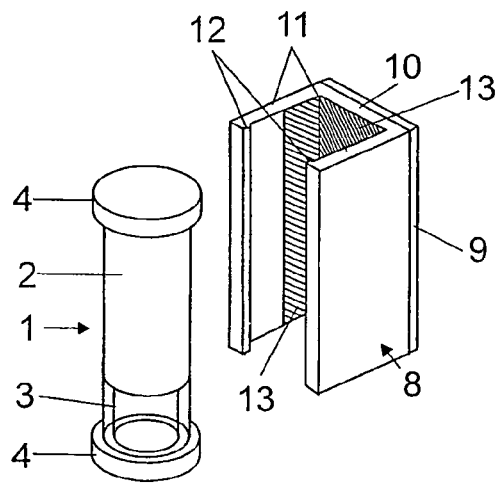
FIG. 5 is an exploded isometric view showing the bracket and colour imparting means as a colour applied to the bracket and visible through the transparent zone of the indicator unit and assembly described with reference to FIGS. 1 to 4.

One form of device is illustrated most clearly in FIG. 5 in which the bracket is in the form of a clip (8) of channel shape in cross-section with a self-adhesive mounting pad (9) on the outside of its web portion (10). The free edges of the flanges (11) have inwardly directed lips (12) so that the indicator unit can be clipped into the channel and removed therefrom easily. In this regard it is to be noted that the flanges (4) on the container itself will act as stops and prevent the container from falling downwards out of the clip in the event that the flanges fail to engage the outside walls of the container adequately.

Figure 3:
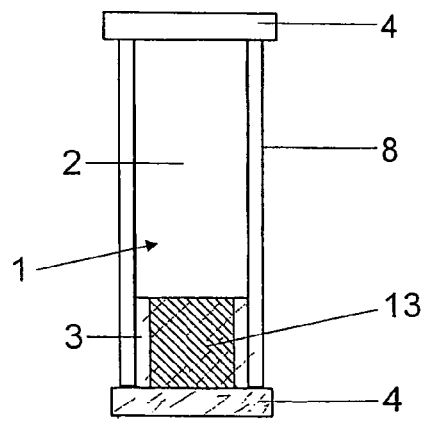
FIG. 3 is an elevation of the indicator unit installed in a supporting bracket to form one embodiment of freezer failure indicator assembly of the invention.

In the embodiment of the invention illustrated in FIGS. 1 to 5, the inside surface of the web of the channel and halfway up the height of the flanges, has applied thereto a coating or layer of a colour imparting material (13) in order to provide said first colour that is to be visible through the transparent part (3) of the container. The said first colour is preferably a suitable blue that is associated with freezing temperatures but may also be a suitable green. As illustrated in FIG. 3 the blue or green colour is visible when the water is absent from the transparent zone.

For use the freezer failure indicator described above may be provided with suitable indicia and instructions applied to the outer surface thereof to indicate the orientation of the container for the purposes of use in the manner described below.

In order to prepare the indicator assembly for use the bracket is firstly attached to a suitable area within a freezer where it is out of the way but clearly visible. A preferred position, where appropriate, is the inside of the door of a freezer at approximately eye-level when the freezer door is opened. The indicator unit is then introduced into the bracket in the orientation illustrated in FIG. 1, ie with the opaque part (2) lowermost. The volume of water (5) will therefore freeze in the opaque end of the container. In order to render the indicator unit functional it is then inverted to the orientation illustrated in FIG. 2 with the opaque part (2) uppermost and the frozen water (5) locked in position within it. The frozen water is thus held in an elevated position whilst the blue or green colour of the inside surface of the bracket is visible through the lower transparent part (3) as shown clearly in FIG. 3 thereby indicating that there has been no harmful freezer failure.

Figure 4:
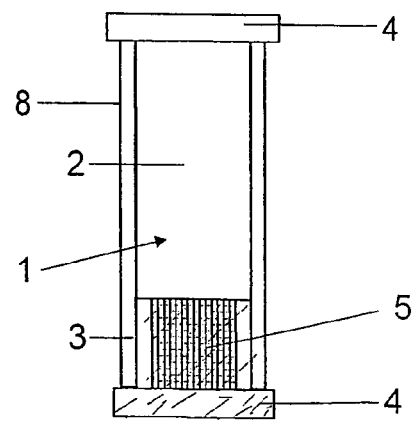
FIG. 4 is an elevation of the indicator assembly shown in FIG. 3 and indicating the appearance of the indicator unit after a failure has occurred.

In the event of freezer failure which results in the water (5) thawing, the water will fall down into the lower end of the container to exhibit its red colour through the transparent zone and simultaneously obscure the colour of the inside of the clip. Such a condition is illustrated in FIG. 4. The presence of the red opaque water in the transparent zone will be most noticeable in that there has been a distinct colour change from blue or green to red. With white being the colour of the opaque part of the container as well as the colour of the bracket (other than the colour applied to its inner surface) the colours are particularly noticeable.

Figure 6:
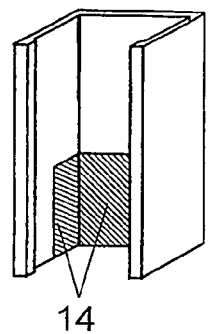
FIG. 6 is an oblique projection of a variation of the bracket illustrated in FIG. 5.

FIG. 5 illustrates the entire length of the inner surface of the channel being coloured as described above but, as illustrated in FIG. 6, the colour may be applied only for a section of the length of the bracket corresponding roughly to that in alignment with the transparent zone of the indicator unit when said transparent zone is lowermost as indicated by numeral (14).

Figure 7:
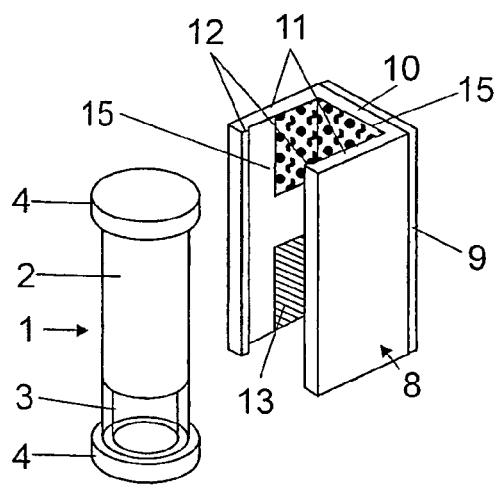
FIG. 7 is an exploded isometric view showing a second embodiment of supporting bracket wherein a third colour imparting means is provided; and, FIG. 8 is an elevation of the indicator assembly illustrated in FIG. 7 with the indicator unit in an orientation corresponding to pre-freezing thereof.
Figure 8:
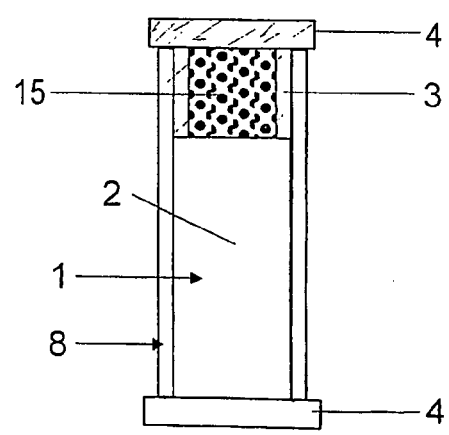

Turning now to the embodiment of the invention illustrated in FIGS. 7 and 8, the operatively upper end region of the inner surface of the clip (8) is coloured amber or orange as indicated by numeral (15).

With the opaque part (2) lowermost and the transparent part (3) uppermost, the amber or orange colour is quite clearly visible through the transparent part and this serves as an indication or reminder that the container has not been inverted to its functional position in which the transparent part is lowermost and the green or blue colour is visible through it. Apart from this the indicator assembly operates in exactly the same way as is described above.

It is envisaged that the addition of the third warning colour that is adapted to draw attention to the fact that the container has not been re-orientated to render it functional is a significant optional additional feature to the freezer failure indicator described with reference to FIGS. 1 to 5.

The embodiments of the invention described above can be varied in many ways without departing from the scope hereof which is limited only to the use of a single liquid in an indicator unit and the provision of a second colour that becomes obscured by the liquid to provide an indication of freezer failure.

The invention claimed is:

1. A freezer failure indicator assembly comprising an indicator unit and an open channel support bracket therefor wherein the indicator unit is in the form of a closed container defined by walls forming an internal cavity containing a quantity of a liquid having a freezing point selected so that it will be frozen at normal operating temperatures of a freezer with which it is to be used and wherein the walls of the container have an opaque zone and a transparent zone arranged to enable the liquid to be pre-frozen within the opaque zone followed by re-orientating the container relative to the bracket to render the transparent zone of the wall visible, devoid of any liquid in such zone, and lower than the pre-frozen liquid, and wherein thawing of the pre-frozen liquid causes it to move to become visible through the transparent zone, wherein color imparting means are carried by the bracket that operatively supports the indicator unit so as to be visible through the said transparent zone in the operative position thereof to thereby impart a first color to the transparent zone in the absence of any liquid being present in the transparent zone and wherein the liquid is rendered opaque so as to obscure such first color imparting means when the liquid is present in the transparent zone, the liquid having a second color chosen to provide a color indication distinctly different from said first color when the liquid is present in the transparent zone.

2. A freezer failure indicator assembly as claimed in claim 1 in which the container is of upright shape capable of being supported in either of two generally vertical orientations.

3. A freezer failure indicator assembly as claimed in claim 2 in which the indicator unit has a flange at each end thereof for cooperation with a support bracket or clip to inhibit longitudinal movement of the indicator in the support bracket or clip.

4. A freezer failure indictor assembly as claimed in claim 1 in which the support bracket is adapted to be attached to the inside wall of a freezer.

5. A freezer failure indicator assembly as claimed in claim 1 in which the liquid is water the freezing point of which has optionally been modified by the addition of one or more additives.

6. A freezer failure indicator assembly as claimed in claim 1 in which the opaque portion of the side walls extends from one end of the container for about two-thirds to three quarters of the height of the container whilst the rest of the height defines said transparent zone.

7. A freezer failure indicator assembly as claimed in claim 1 in which the second color is red.

8. A freezer failure indicator assembly as claimed in claim 1 in which the first color is selected from blue and green.

9. A freezer failure indicator assembly as claimed in claim 1 in which the bracket has third color imparting means for imparting a third color to the transparent zone in its position corresponding to pre-freezing of the indicator unit.

10. A freezer failure indicator assembly as claimed in claim 9 in which the third color is selected from orange and amber.

* * * * *